US008291085B2

(12) United States Patent
Shiigi et al.

(10) Patent No.: US 8,291,085 B2
(45) Date of Patent: Oct. 16, 2012

(54) VALUE INFORMATION TRANSFER SYSTEM AND VALUE INFORMATION TRANSFER METHOD

(75) Inventors: Daisuke Shiigi, Kanagawa (JP); Taro Kurita, Tokyo (JP); Toshiharu Takemura, Tokyo (JP); Toyokazu Ota, Tokyo (JP); Yasumasa Nakatsugawa, Tokyo (JP)

(73) Assignee: FeliCa Networks, Inc., Tokyo (JP)

( * ) Notice: Subject to any disclaimer, the term of this patent is extended or adjusted under 35 U.S.C. 154(b) by 1497 days.

(21) Appl. No.: 11/457,695

(22) Filed: Jul. 14, 2006

(65) Prior Publication Data

US 2007/0033285 A1    Feb. 8, 2007

(30) Foreign Application Priority Data

Aug. 4, 2005    (JP) ................................. 2005-227003

(51) Int. Cl.
*G06F 15/16*    (2006.01)
(52) U.S. Cl. ........... 709/227; 709/203; 709/204; 705/39
(58) Field of Classification Search .................. 709/227, 709/201, 203, 204, 218, 219, 223; 710/1, 710/7, 70
See application file for complete search history.

(56) References Cited

U.S. PATENT DOCUMENTS

| 6,105,008 | A | 8/2000 | Davis et al. | |
|---|---|---|---|---|
| 6,652,380 | B1* | 11/2003 | Luciano | 463/25 |
| 2001/0007983 | A1* | 7/2001 | Lee | 705/69 |
| 2002/0065774 | A1* | 5/2002 | Young et al. | 705/41 |
| 2003/0097402 | A1* | 5/2003 | Vindeby | 709/203 |
| 2003/0149662 | A1* | 8/2003 | Shore | 705/39 |
| 2005/0051619 | A1 | 3/2005 | Graves et al. | |
| 2005/0125317 | A1 | 6/2005 | Winkelman, III et al. | |
| 2005/0224589 | A1 | 10/2005 | Park et al. | |
| 2006/0004656 | A1* | 1/2006 | Lee | 705/39 |
| 2006/0094499 | A1* | 5/2006 | Amemiya et al. | 463/29 |

FOREIGN PATENT DOCUMENTS

| JP | 10-171897 | 6/1998 |
|---|---|---|
| JP | 2000-293658 | 10/2000 |
| JP | 2000-348120 | 12/2000 |
| JP | 2002-9844 | 1/2002 |
| JP | 2003-6711 | 1/2003 |
| JP | 2003-198583 | 7/2003 |
| JP | 2004-13438 | 1/2004 |
| JP | 2004-272470 | 9/2004 |
| JP | 2004-341643 | 12/2004 |
| JP | 2004-357294 | 12/2004 |
| JP | 2005-38209 | 2/2005 |
| WO | WO 2004/088641 A2 | 10/2004 |

* cited by examiner

*Primary Examiner* — Barbara Burgess
(74) *Attorney, Agent, or Firm* — Oblon, Spivak, McClelland, Maier & Neustadt, L.L.P.

(57) ABSTRACT

A value information transfer system transfers value information held by a transfer source communication device, which is connected via a network to a transfer management server, to a transfer destination communication device. The transfer source communication device includes a transfer request acceptor for accepting a transfer request for transfer of the value information held by the transfer source communication device to the transfer destination communication device, a transfer request information transmitter for transmitting the request as transfer request information to the transfer management server, and a command executor for executing a command generated by the transfer management server. The transfer management server includes a command generator for generating at least one command and a command transmitter. The transfer destination communication device includes a command receiver for receiving the command using wireless communication and a value information increasing unit for increasing the value information held by the transfer destination communication device.

14 Claims, 12 Drawing Sheets

FIG. 3A

| USER ID | AMOUNT OF VALUE INFORMATION |
|---------|------------------------------|
| ABCDEF  | 10,000 YEN                   |
| ZZDABF  | 300 YEN                      |
| AGFDEB  | 3,150 YEN                    |
| ⋮       | ⋮                            |

FIG. 3B

| USER ID | COMMUNICATION DEVICE ID |
|---------|-------------------------|
| ABCDEF  | 101345                  |
| ZZDABF  | 101346                  |
| AGFDEB  | 101347                  |
| ⋮       | ⋮                       |

FIG. 3C

| DATE | TRANSFER SOURCE COMMUNICATION DEVICE ID | TRANSFER DESTINATION COMMUNICATION DEVICE ID | VALUE INFORMATION TO TRANSFER |
|------|------------------------------------------|-----------------------------------------------|--------------------------------|
| 07/20/2005 15:30 | 101345 | 101347 | 110 YEN |
| 07/21/2005 09:11 | 101347 | 101346 | 3,000 YEN |
| ⋮ | ⋮ | ⋮ | ⋮ |

203

VALUE INFORMATION TRANSFER SYSTEM AND VALUE INFORMATION TRANSFER METHOD

CROSS REFERENCES TO RELATED APPLICATIONS

The present invention contains subject matter related to Japanese Patent Application JP 2005-227003 filed in the Japanese Patent Office on Aug. 4, 2005, the entire contents of which are incorporated herein by reference.

BACKGROUND OF THE INVENTION

1. Field of the Invention

The present invention relates to value information transfer systems and value information transfer methods for transferring value information between communication devices, and in particular, to a value information transfer system and a value information transfer method for transferring value information via a transfer management server.

2. Description of the Related Art

At present, passengers can open and go through an automatic ticket gate in a train station without purchasing a ticket by using communication devices such as contactless IC cards storing value information. In addition, goods can be purchased using cellular phones provided with internal contactless IC chips.

There are various types of the value information described above, including money information as electronic money, distance-traveled (mileage) point information accompanying purchased flight tickets, and discount point information accompanying the purchase of goods, and the like.

In the same sense as that in which a user transfers his or her paper money to another user, it has been desirable to provide, for example, a system for transferring value information held by a user to a storage area in a communication device held by another user (an example of such a system is described in Japanese Unexamined Patent Application Publication No. 2004-13438).

SUMMARY OF THE INVENTION

When transferring value information, communication is first performed between a transfer source communication device and a server to transfer the value information, and subsequently communication is performed to transfer the value information from the server to a transfer destination communication device. In such a manner, the transfer of value information is not smoothly or quickly performed, and the processing is complicated.

When transferring the value information between the communication devices, it is necessary to reliably delete the value information in the transfer source and to transfer the value information to the transfer destination. In such transfer of the value information, it is difficult to prevent duplication of the value information in the transfer source.

When transferring the value information between the communication devices, in the event that the transfer of the value information fails, it is difficult to restore the value information in the transfer source to the original state without duplicating the value information in the transfer source.

In the recording area in which the value information is saved, it is necessary for security reasons to limit those (including the communication device itself) that can have access to the value information to minimum because highly confidential information is stored in the recording area.

In view of the above-described problems, it is desirable to provide a novel and improved value information transfer system and a value information transfer method for securely and legitimately transferring value information between communication devices while keeping communication with a server to minimum.

According to an embodiment of the present invention, there is provided a value information transfer system for transferring value information, including a transfer source communication device, a transfer destination communication device, and a transfer management server operable to manage transfer of the value information. The value information held by the transfer source communication device is transferred to the transfer destination communication device. The transfer source communication device is connected via a network to the transfer management server. The transfer source communication device includes a transfer request acceptor operable to accept a transfer request for requesting part or all of the value information held by the transfer source communication device to be transferred to the transfer destination communication device, a transfer request information transmitter operable to transmit the request, which is accepted by the transfer request acceptor, as transfer request information to the transfer management server via the network, and a command executor operable to execute at least one type of command, which is generated by the transfer management server, necessary for transferring the value information from the transfer source communication device to the transfer destination communication device. The transfer management server includes a command generator operable to generate said at least one type of command in response to the transfer request information from the transfer source communication device, and a command transmitter operable to transmit the command generated by the command generator to the transfer source communication device. The transfer destination communication device includes a command receiver operable to receive the command, which is generated by the command generator of the transfer management server, from the transfer source communication device using wireless communication when the transfer destination communication device exists in a communicable range in which the transfer destination communication device can perform short-distance wireless communication with the transfer source communication device, and a value information increasing unit operable to increase, in response to the command, value information held by the transfer destination communication device by an amount of the value information to be transferred from the transfer source communication device to the transfer destination communication device.

The command generator may generate a reduction command to reduce the value information held by the transfer source communication device by the amount of the value information to be transferred from the transfer source communication device to the transfer destination communication device. The command transmitter may transmit the reduction command to the transfer source communication device via the network. Thus, the command executor can reduce the value information stored in the transfer source communication device in response to the reduction command.

The command generator may generate an identification information requesting command to request for identification information of the transfer destination communication device. The command transmitter may transmit the identification information requesting command to the transfer source communication device via the network. When the transfer destination communication device serving as a destination of transfer of the value information exists in the communicable range, the command receiver included in the transfer destination communication device may receive the identification information requesting command. In response to the identification information requesting command, an identification information obtaining unit included in the transfer destination communication device may obtain the identification information of the transfer destination communication device.

The transfer source communication device may further include an interruption detector operable to detect interruption of wireless communication between the transfer source communication device and the transfer destination communication device, and a transfer cancel requesting unit operable to request the transfer management server to restore the value information held by the transfer source communication device and/or the transfer destination communication device to a state prior to the transfer. The transfer management server may further include a value information transfer database storing a record including transfer source communication device identification information for identifying the transfer source communication device, transfer destination communication device identification information for identifying the transfer destination communication device, and the value information to be transferred from the transfer source communication device to the transfer destination communication device. The command generator may generate a transfer canceling command to restore, on the basis of the record stored in the value information transfer database, the value information held by the transfer source communication device and/or the transfer destination communication device to the state prior to the transfer. The command transmitter may transmit the transfer canceling command to the transfer source communication device.

The record stored in the value information transfer database may further include a date at which the value information is transferred. Since the date at which the value information is transferred from the transfer source communication device to the transfer destination communication device is recorded, the situation of transfer of value information can be checked one by one in real time. Also, the transfer of the value information can be appropriately cancelled (value information can be restored to the original state).

When no report of completion of execution of the command is transmitted from the transfer destination communication device within a predetermined period of time after the command has been transmitted to the transfer destination communication device, the interruption detector may detect interruption of wireless communication.

According to another embodiment of the present invention, there is provided a value information transfer system for transferring value information, including a transfer source communication device, a transfer destination communication device, and a transfer management server operable to manage transfer of the value information The value information held by the transfer source communication device is transferred to the transfer destination communication device. The transfer destination communication device is connected via a network to the transfer management server. The transfer destination communication device includes a transfer request acceptor operable to accept a transfer request for requesting part or all of the value information held by the transfer source communication device to be transferred to the transfer destination communication device, a transfer request information transmitter operable to transmit the request, which is accepted by the transfer request acceptor, as transfer request information to the transfer management server via the network, and a command executor operable to execute at least one type of command, which is generated by the transfer management server, necessary for transferring the value information from the transfer source communication device to the transfer destination communication device. The transfer management server includes a command generator operable to generate said at least one type of command in response to the transfer request information from the transfer destination communication device, and a command transmitter operable to transmit the command generated by the command generator to the transfer destination communication device. The transfer source communication device includes a command receiver operable to receive the command, which is generated by the command generator of the transfer management server, from the transfer destination communication device using wireless communication when the transfer source communication device exists in a communicable range in which the transfer source communication device can perform short-distance wireless communication with the transfer destination communication device, and a value information reduction unit operable to reduce, in response to the command, the value information held by the transfer source communication device by an amount of the value information to be transferred from the transfer source communication device to the transfer destination communication device.

According to another embodiment of the present invention, there is provided a value information transfer method for transferring value information held by a transfer source communication device to a transfer destination communication device. The value information transfer method includes the steps of accepting a transfer request for requesting part or all of the value information held by the transfer source communication device to be transferred to the transfer destination communication device; transmitting the accepted transfer request as transfer request information via a network to a transfer management server for managing transfer of the value information; transmitting a reduction command to reduce the value information held by the transfer source communication device by an amount of the value information to be transferred from the transfer source communication device to the transfer destination communication device via the network to the transfer source communication device serving as a source of the transfer request; reducing the value information held by the transfer source communication device by the amount of the value information to be transferred from the transfer source communication device to the transfer destination communication device; transmitting an increasing command to increase value information held by the transfer destination communication device by the amount of the value information to be transferred from the transfer source communication device to the transfer destination communication device from the transfer management server to the transfer source communication device via the network; transmitting the increasing command to the transfer destination communication device using wireless communication when the transfer destination communication device exists in a communicable range in which the transfer destination communication device can perform short-distance wireless communication with the transfer source communication device; and increasing, in response to the increasing command, the value information held by the transfer destination communication device by the amount of the value information to be transferred from the transfer source communication device to the transfer destination communication device.

The value information transfer method may further include the steps of transmitting, upon reception of an identification information obtaining command to obtain identification information regarding the transfer destination communication device from the transfer management server via the network, when the transfer destination communication device exists in the communicable range, the identification information obtaining command to the transfer destination communication device; transmitting the identification information of the transfer destination communication device, which is transmitted from the transfer destination communication device, to the transfer management server via the network; and recording at least one of identification information regarding the transfer destination communication device and the value information to be transferred from the transfer source communication device to the transfer destination communication device in association with identification information regarding the transfer source communication device included in the transfer request information. Thus, the transfer of the value information can be managed/monitored one by one in real time, and the value information can be restored to the original state in the event of a failure such as communication interruption. It is also possible to prevent unauthorized duplication of the value information using the communication device.

The value information transfer method may further include the steps of transmitting, when the value information held by the transfer destination communication device is not increased within a predetermined period of time, information indicating that the increasing of the value information is not completed from the transfer source communication device to the transfer management server via the network; receiving a transfer canceling command to restore the reduced value information to the original state from the transfer management server via the network; and changing, in response to the transfer canceling command, the value information held by the transfer source communication device to a state prior to the reduction of the value information.

According to another embodiment of the present invention, there is provided a value information transfer method for transferring value information held by a transfer source communication device to a transfer destination communication device. The value information transfer method includes the steps of accepting a transfer request for requesting part or all of the value information held by the transfer source communication device to be transferred to the transfer destination communication device; transmitting the accepted transfer request as transfer request information via a network to a transfer management server for managing transfer of the value information; transmitting an increasing command to increase value information held by the transfer destination communication device by an amount of the value information to be transferred from the transfer source communication device to the transfer destination communication device via the network to the transfer destination communication device serving as a source of the transfer request; increasing the value information held by the transfer destination communication device by the amount of the value information to be transferred from the transfer source communication device to the transfer destination communication device; transmitting a reduction command to reduce the value information held by the transfer source communication device by the amount of the value information to be transferred from the transfer source communication device to the transfer destination communication device from the transfer management server to the transfer destination communication device via the network; transmitting the reduction command to the transfer source communication device using wireless communication when the transfer source communication device exists in a communicable range in which the transfer source communication device can perform short-distance wireless communication with the transfer destination communication device; and reducing, in response to the reduction command, the value information held by the transfer source communication device by the amount of the value information to be transferred from the transfer source communication device to the transfer destination communication device.

The value information transfer method may further include the steps of receiving an identification information obtaining command for obtaining identification information regarding the transfer source communication device from the transfer management server via the network and, when the transfer source communication device exists in the communicable range, transmitting the identification information obtaining command to the transfer source communication device; transmitting, upon reception of the identification information regarding the transfer source communication device, the identification information regarding the transfer source communication device to the transfer management server via the network; and associating information regarding the transfer destination communication device included in the transfer request information, the identification information regarding the transfer source communication device, and the value information to be transferred from the transfer source communication device to the transfer destination communication device with one another.

The value information transfer method may further include the steps of transmitting, when the value information held by the transfer source communication device is not reduced within a predetermined period of time, information indicating that the reduction of the value information is not completed from the transfer destination communication device to the transfer management server via the network; obtaining a transfer canceling command to restore the increased value information to the original state from the transfer management server via the network; and executing the transfer canceling command to change the value information held by the transfer destination communication device to a state prior to the increasing of the value information.

The communicable range may be a short-distance range in which the transfer source communication device can be placed over the transfer destination communication device or vice versa. The short distance ranges from, for example, a few tens of centimeters to a few tens of meters, and more preferably ranges from 10 cm to 20 cm.

According to the embodiments of the present invention, communication with the server only involves communication between the transfer source communication device and the server. Therefore, communication via the server is reduced, and value information can be efficiently transferred between the communication devices.

BRIEF DESCRIPTION OF THE DRAWINGS

FIGS. 3A to 3C are diagrams of the schematic data structure of a value information database and the like according to the first embodiment;

DESCRIPTION OF THE PREFERRED EMBODIMENTS

Figure 1:
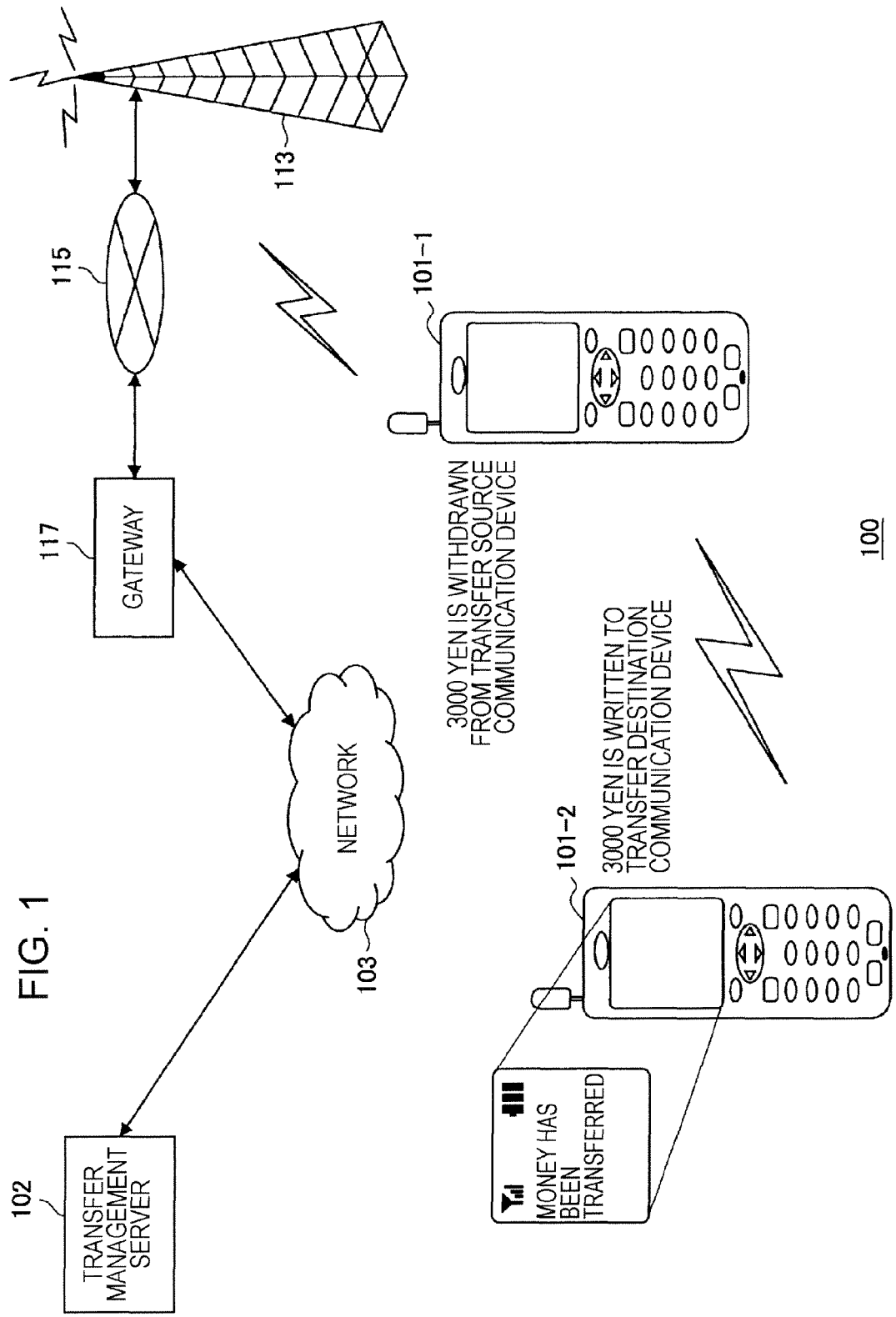
FIG. 1 is a diagram of the schematic configuration of a value information transfer system according to a first embodiment of the present invention.

Preferred embodiments of the present invention will be described in detail with reference to the accompanying drawings. In the following description and the accompanying drawings, components having substantially the same function and structure are given the same reference numerals, and repeated descriptions thereof will be omitted.

First Embodiment

Referring to FIG. 1, a value information transfer system according to a first embodiment of the present invention will be described. FIG. 1 schematically shows the configuration of the value information transfer system according to the first embodiment.

As shown in FIG. 1, a value information transfer system 100 includes communication devices 101-1 and 101-2 (hereinafter may collectively be referred to as the "communication device 101"), a transfer management server 102, a network 103, a base station 113, a packet communication network 115, and a gateway 117.

The value information transfer system 100 is a system capable of transferring value information held by the communication device 101-1 (transfer source communication device) to the communication device 101-2 (transfer destination communication device).

The communication device 101 is a communication terminal provided with a short-distance wireless communication function such as near field communication (NFC), a packet communication function using a cellular phone, and the like.

The communication device 101 can access the transfer management server 102 using a calling function via the base station 113 or via the base station 113, the packet communication network 115, and the gateway 117.

The communication device 101 can execute a client application with a browsing function and accept a transfer request for transfer of value information on the screen using an input unit such as a button.

Using the browsing function described above, the communication device 101 can request the transfer management server 102 to transfer value information, receive various commands necessary for transferring the value information from the transfer management server 102, and display the execution results on the screen.

The communication device 101 is provided with a reader/writer (R/W) for reading and writing data from and to the external communication device 101 and a contactless IC card module (including a contactless IC card).

When the user places the communication device 101 over the external communication device 101, the communication device 101 can exchange data directly and wirelessly with the external communication device 101 within a short-distance communication range of a few tens of centimeters or the like.

When accessing the transfer management server 102, the communication device 101 holds an authentication key (client authentication key) for performing mutual authentication with the transfer management server 102 for, for example, each service. Since the client authentication key is highly confidential information, the client authentication key is stored in a tamper-resistant storage area or the like. However, this is not necessarily crucial.

The client authentication key may be implemented as any key including an asymmetrical key such as Rivest-Shamir-Adleman (RSA), advanced encryption standard (AES), or the like, and as a symmetrical key such as data encryption standard (DES), AES, or the like. In the case of a symmetrical key, it is necessary to secretly distribute the key to a partner. Therefore, the key is not directly distributed via a communication network such as the Internet, but is distributed via other means such as post or the like.

Although subsequently described in detail, the communication device 101 holds client application identification information for identifying each client application stored in the communication device 101. On the basis of the client application identification information, a proxy system 105 may authenticate the communication device 101. The communication device 101 does not necessarily hold the client application identification information. The communication device 101 may not hold the client application identification information.

As shown in FIG. 1, in the value information transfer system according to the first embodiment, when the transfer source communication device accepts a transfer request from the user to transfer value information, the transfer source communication device makes a transfer request (transfer of 3000 yen) to the transfer management server 102.

The transfer management server 102 sends a command (reduction command) to the transfer source communication device to reduce the value information held therein by the amount to be transferred (reduction of 3000 yen).

Also in a value information database included in the movement management server 102, value information corresponding to the transfer source communication device is reduced. The value information database will be described subsequently.

Next, the transfer management server 102 sends a command (or an increasing command) to the transfer destination communication device via the transfer source communication device to increase the value information by the amount transferred. The increasing command is directly transmitted using short-distance wireless communication between the transfer source communication device and the transfer destination communication device.

In response to the increasing command, the transfer destination communication device increases the value information stored in its storage area (increase of 3000 yen). In this manner, the value information can be transferred from the transfer source communication device to the transfer destination communication device.

When the value information is transferred to the transfer destination communication device, as shown in FIG. 1, a message such as "Money has been transferred" indicating that the value information has been transferred is displayed on the screen, and the user accepts the transfer of the value information using the button or the like of the input unit.

At the same time, there are systems for allowing communication devices such as contactless IC cards to directly transfer value information between each other. In such a system, there is no server existing between the communication devices, and value information held by all the communication devices is counted as the total amount in the entire system. Thus, how much value information has been transferred at what point from which communication device is not accurately managed.

Examples of the value information include the above-described point information, electronic money, and the like. In this description, as described above, information that is transferred on a network or the like and that has a predetermined value, such as a money value, is collectively referred to as electronic value information (or simply as value information).

As shown in FIG. 1, the case in which the communication device 101-1 is a device functioning as a transfer source communication device for transferring value information to the communication device 101-2, and the communication device 101-2 is a device functioning as a transfer destination communication device for obtaining the value information from the communication device 101-1 is described by way of example. However, the present invention is not limited to this example. Alternatively, the present invention can be implemented in the case in which the communication device 101-1 functions as a transfer destination communication device and the communication device 101-2 functions as a transfer source communication device or in the case in which both communication devices function as transfer source communication devices or transfer destination communication devices.

In this embodiment, the case in which the communication device 101 has a contactless IC card module will be described by way of example. This contactless IC card module includes a contactless IC card and is a general term for devices with a contactless IC card function.

The word "access" is a general term for processing information via a communication network, such as using the system, connecting to the system or server, referring to a file, saving a file, deleting a file, or changing a file.

Figure 2:
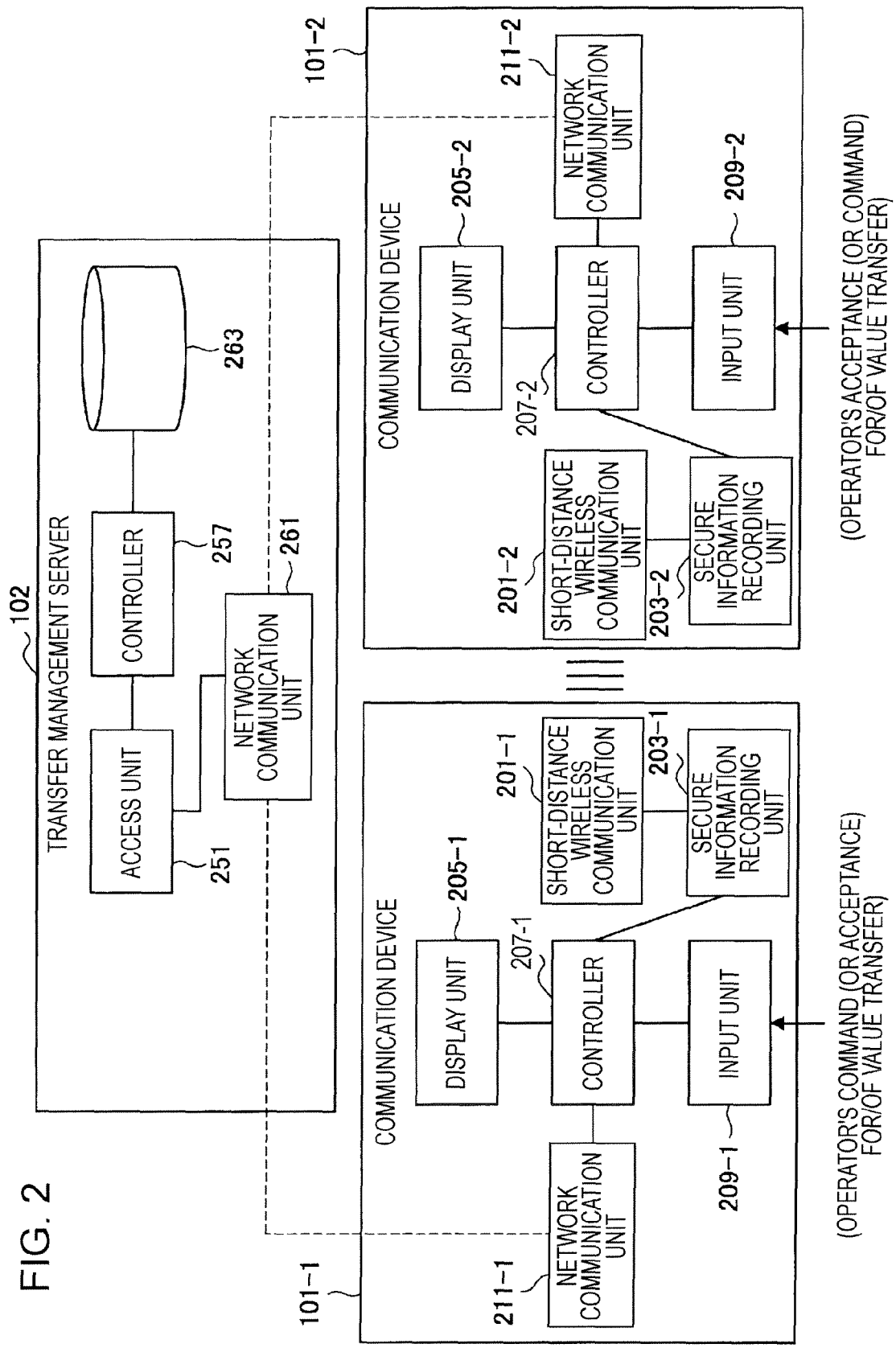
FIG. 2 is a block diagram of the schematic configuration of each device included in the value information transfer system according to the first embodiment.

Referring now to FIG. 2, each device included in the value information transfer system according to the first embodiment will be described. FIG. 2 is a block diagram of the schematic configuration of each device included in the value information transfer system according to the first embodiment.

As shown in FIG. 2, the communication device 101 includes a short-distance wireless communication unit (or a command executor, a value information increasing unit, an identification information obtaining unit, etc.) 201, a secure information recording unit 203, a display unit 205, a controller (or an interruption detector) 207, an input unit (or a transfer request acceptor) 209, and a network communication unit 211.

The short-distance wireless communication unit 201 and the secure information recording unit 203 included in the communication device 101 correspond to the above-described contactless IC card module (contactless IC chip). The other elements included in the communication device 101, namely, the display unit 205, the controller 207, the input unit 209, and the network communication unit 211, correspond to elements included in the cellular phone shown in FIG. 1.

The short-distance wireless communication unit 201 includes an antenna, a tuner, a modem, and an IC controller for controlling the short-distance wireless communication unit 201 and the secure information recording unit 203.

When the short-distance wireless communication unit 201 approaches within a communicable area that is within, for example, 20 cm of the short-distance wireless communication unit 201 included in the external communication device 101, the short-distance wireless communication unit 201 performs predetermined processing involving polling to identify the partner communication device (e.g., communication device ID) and becomes capable of wirelessly communicating with the partner short-distance wireless communication unit 201.

The secure information recording unit 203 is a storage unit including an electrically erasable programmable read-only memory (EEPROM) or the like and is an authentication unit capable of performing authentication using an encryption/decryption function.

The secure information recording unit 203 stores therein the above-described client key, value information, a user ID for identifying the user, a communication device ID for identifying the communication device (contactless IC card in a narrower sense), a command executor (program) for executing a command to, for example, increase or reduce the value information, and the like.

The display unit 205 includes a display screen for displaying setting information or the like necessary to transfer value information. The display unit 205 may further include a speaker or the like for outputting sound.

The controller 207 controls processes and commands performed by each unit (from the secure information recording unit 203 to the network communication unit 211) included in the communication device 101.

The input unit 209 includes a pointing device including at least one of a button, a trackball, a trackpad, a stylus pen, a dial log, and a joystick that are capable of receiving an operation command, such as a command to transfer value information, from the user or a touch panel for displaying on the display screen an icon or the like for transmitting a transfer request for transfer of value information to the movement management server 102 and, when the icon is directly touched, accepting the transfer request. However, the input unit 209 is not limited to these examples.

The transfer management server 102 includes an access unit (or a command generator) 251 for accessing the secure information recording unit 203 included in the communication device 101, a controller 257, a network communication unit 261, and a storage unit 263.

The storage unit 263 stores a user information database regarding user identification information or the like, a value information database for managing value information, a value information transfer database, or the like. If necessary, the storage unit 263 can read and write a record. The storage unit 263 may be, for example, a hard disk drive (HDD).

Referring to FIGS. 3A to 3C, the data structure of the value information database and the like held in the transfer management server 102 according to the first embodiment will be described. FIGS. 3A to 3C schematically illustrate the data structure of the value information database and the like according to the first embodiment.

FIG. 3A schematically illustrates the data structure of the value information database. As shown in FIG. 3A, the value information database includes a user ID and value information describing the contents of value information currently held by the communication device 101.

In this example, the amount of value information shown in FIG. 3A is described as the amount of electronic money. However, the amount of value information is not limited thereto and may be, for example, the number of points in the case where the value information corresponds to points given for the purchase of goods.

FIG. 3B schematically illustrates the data structure of the user information database. As shown in FIG. 3B, the user information database includes a user ID and a communication device ID.

The communication device ID is identification information for identifying the communication device 101. In a narrower sense, the communication device ID is identification information for identifying the secure information recording unit 203 included in the communication device 101. The secure information recording unit 203 securely stores the communication device ID.

FIG. 3C schematically illustrates the data structure of the value information transfer database. As shown in FIG. 3C, for example, when the communication device 101 sends a transfer request for transfer of value information, a record including the date, the transfer source communication device ID, the transfer destination communication device ID, and the value information to be transferred is generated in the value information transfer database. In the record generation initial state, an initial value (null) or the like is set in each record.

For example, when the transfer source communication device sends a transfer request for transfer of value information (request for giving value information), date information at the time the transfer request has been sent is set as the date in the record. The communication device ID of the communication device 101 set in the transfer request is set as the transfer source communication device ID. Similarly, the amount of value information to be transferred is set as the value information to be transferred. At the time the transfer destination communication device is specified, the transfer destination communication device ID is set.

For example, when the transfer destination communication device sends a transfer request for transfer of value information (request for receiving value information), date information at the time the transfer request has been sent is set as the date in the record. The communication device ID of the communication device 101 set in the corresponding transfer request information is set as the transfer destination communication device ID. Similarly, the amount of value information to be transferred is set as the value information to be transferred. At the time the transfer source communication device is specified, the transfer source communication device ID is set.

Figure 4:
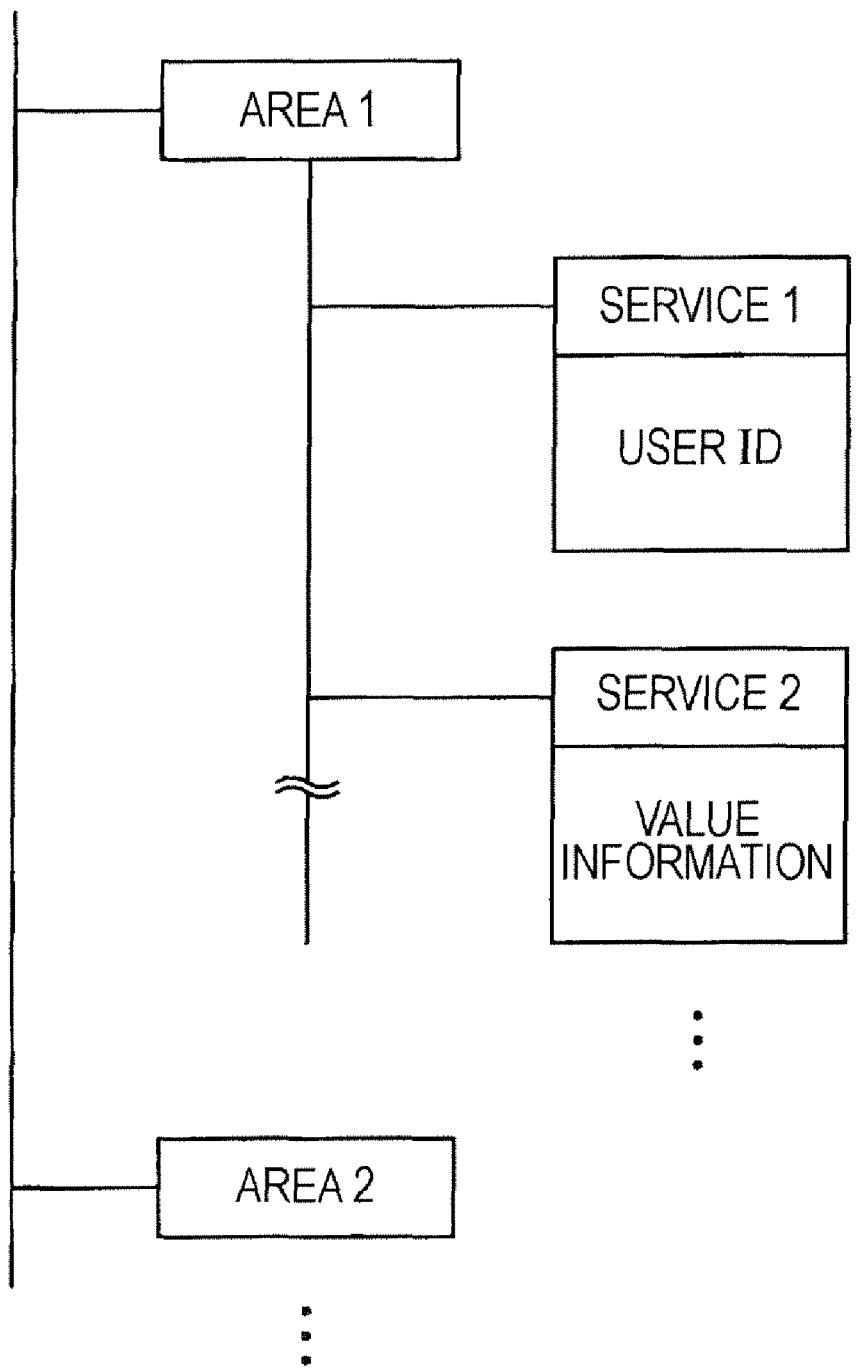
FIG. 4 is a diagram of the schematic configuration of a storage area in a secure information recording unit according to the first embodiment.

Referring now to FIG. 4, a storage area in the secure information recording unit 203 according to the first embodiment will be described. FIG. 4 schematically illustrates the structure of the storage area in the secure information recording unit 203 according to the first embodiment.

As shown in FIG. 4, areas (area 1, area 2, . . . ) are allocated to the storage area in the secure information recording unit 203. Services (service 1, service 2, . . . are allocated to each area.

As shown in FIG. 4, the service 1 stores an user ID for identifying the user. The service 2 stores value information corresponding one-to-one with the user ID. On the basis of the user ID in the service 1, the secure information recording unit 203 can access the value information in the service 2.

Although the case in which the user ID and the value information shown in FIG. 4 are separately stored in different storage areas, i.e., the service 1 and the service 2, has been described by way of example, the embodiment of the present invention is not limited thereto, and the user ID and the value information may be stored in one service in a one-to-one manner.

The value information and/or the user ID are encrypted with the client key or the like. By decrypting the value information and/or the user ID with the client key, the secure information recording unit 203 changes or deletes the value information.

Transfer of Value Information

Figure 5:
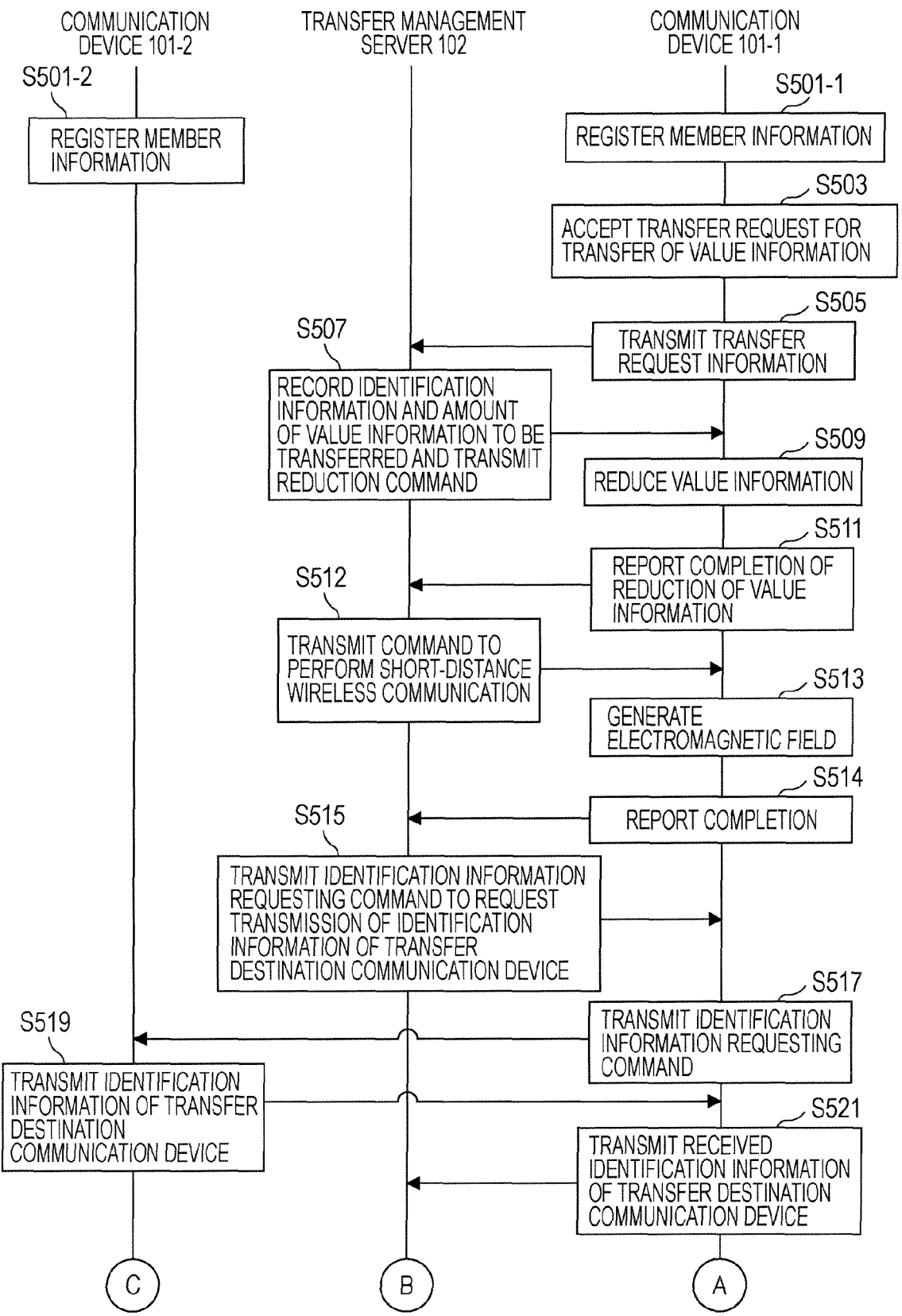
FIG. 5 is a flowchart showing the outline of a value information transfer process according to the first embodiment.
Figure 6:
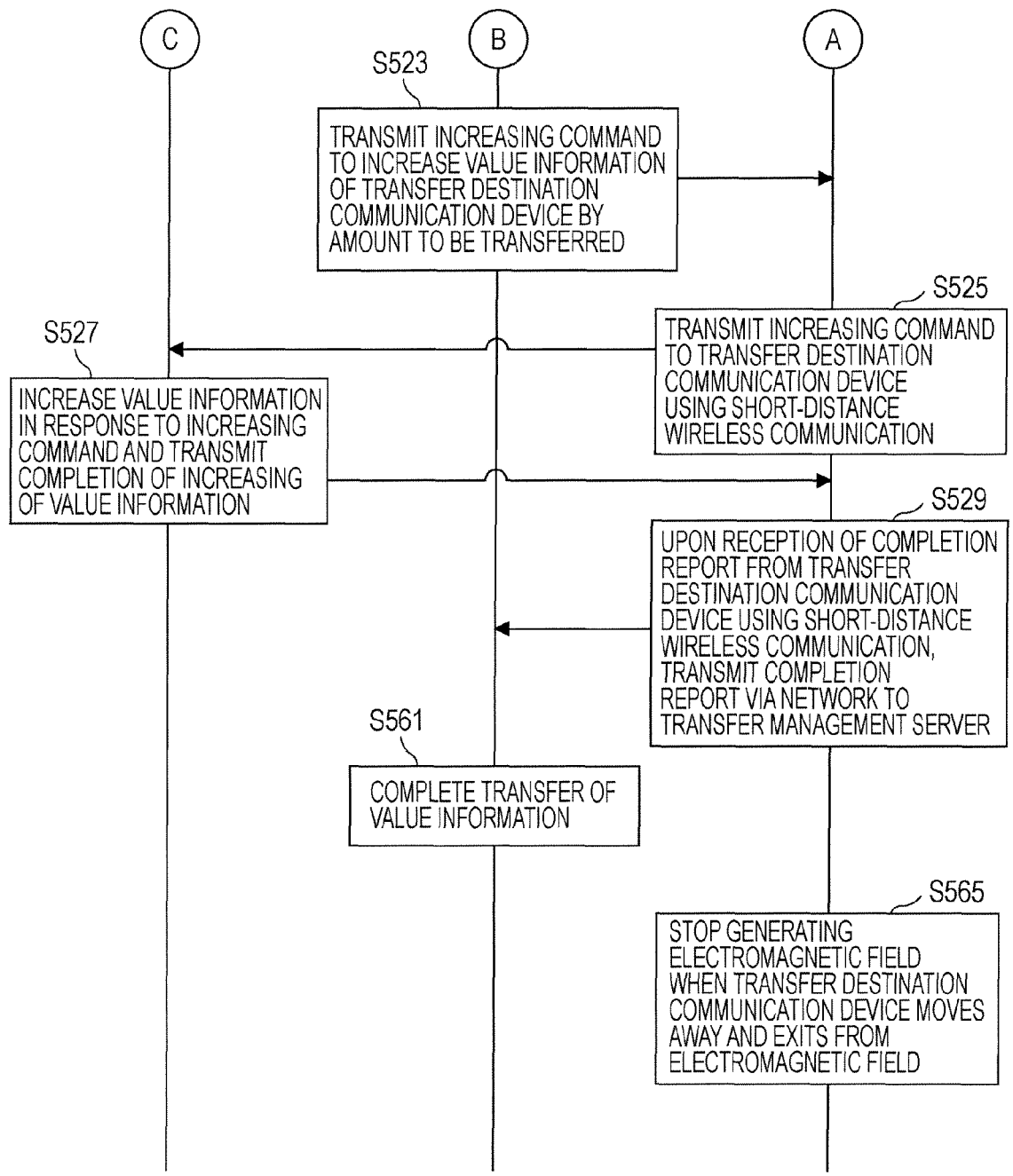
FIG. 6 is a flowchart showing the outline of the value information transfer process according to the first embodiment.

Referring now to FIGS. 5 and 6, a value information transfer process according to the first embodiment will be described. FIGS. 5 and 6 are flowcharts schematically illustrating the value information transfer process according to the first embodiment.

In the value information transfer process according to the first embodiment, the case in which the transfer source communication device accepts a transfer request for transfer of value information will be described by way of example. The case in which the transfer destination communication device accepts a transfer request for transfer of value information will be described subsequently.

As shown in FIG. 5, in order to subscribe to a value information transfer service, member information such as the user ID is registered in the transfer management server 102 using the input unit 209-1 of the transfer source communication device (communication device 101-1) (S501-1).

Member information of the transfer destination communication device (communication device 101-2) is similarly registered (S501-2).

The communication device 101-1 serving as the transfer source communication device accepts a transfer request for transfer of value information via the input unit 209-1 (S503). At the time the request is accepted, for example, the amount of value information to be transferred is input.

When the communication device 101-1 accepts the transfer request (S503) and a network communication start button or the like is selected using the input unit 209-1, the network communication unit 211-1 included in the communication device 101-1 sends transfer request information to the transfer management server 102 (S505).

When the transfer management server 102 receives the transfer request information, the access unit 251 generates a reduction command for the secure information recording unit 203-1 included in the transfer source communication device (communication device 101-1) to reduce the value information by the amount requested to be transferred and transmits the reduction command to the communication device 101-1. In addition, the access unit 251 records the contents of the request in the corresponding record in the value information transfer database described above (S507).

When the network communication unit 211-1 included in the communication device 101-1 receives the reduction command, the secure information recording unit 203-1 decrypts the reduction command with the client key and authenticates that the reduction command is a command from the transfer management server 102. It is possible to authenticate that the reduction command is a command from the transfer management server 102 without using the client key.

In response to the reduction command, the secure information recording unit 203-1 reduces value information stored in its storage area (service 2) by the amount to be transferred, which is set in the reduction command (S509).

Upon completion of the reduction of the value information by the secure information recording unit 203-1 (S509), the network communication unit 211-1 included in the communication device 101-1 transmits a completion report to the transfer management server 102 (S511).

When the network communication unit 261 receives the completion report, the access unit 251 generates a command (wireless communication starting command) to activate the short-distance wireless communication unit 201-1 such as NFC or the like and to send a report using short-distance wireless communication.

The storage unit 263 reduces, in the value information database, the value information of the corresponding communication device 101-1 by the amount transferred.

The network communication unit 261 transmits the wireless communication starting command to the communication device 101-1 (S512).

When the communication device 101-1 receives the wireless communication starting command, the short-distance wireless communication unit 201-1 generates an electromagnetic field (S513).

After the electromagnetic field has been generated (S513), the network communication unit 211-1 transmits a report of completion of generation of the electromagnetic field to the transfer management server 102 (S514).

To specify the transfer destination communication device (communication device 101-2), the access unit 251 generates a command (identification information requesting command) to obtain the communication device ID stored in the secure information recording unit 203-2 included in the communication device 101-2.

The network communication unit 261 transmits the identification information requesting command to the communication device 101-1 (S515).

When the partner transfer destination communication device (communication device 101-2) approaches within a communication range in which short-distance wireless communication can be performed and the density of the electromagnetic field changes, the short-distance wireless communication unit 201-1 captures the communication device 101-2 and transmits the identification information requesting command to the short-distance wireless communication unit 201-2 using wireless communication (S517).

In response to the identification information requesting command, the secure information recording unit 203-2 included in the communication device 101-2 transmits the communication device ID held therein to the communication device 101-1 using wireless communication (S519).

When the communication device ID of the communication device 101-2 is transmitted using wireless communication to the communication device 101-1, the communication device ID is transmitted to the transfer management server 102 (S521).

Referring to FIG. 6, the access unit 251 included in the transfer management server 102 generates a command (increasing command) to increase the value information held by the communication device 101-2 by the amount to be transferred, and the network communication unit 261 transmits the increasing command to the communication device 101-1 (S523).

The short-distance wireless communication unit 201-1 transmits the increasing command to the communication device 101-2 using wireless communication (S525).

In response to the increasing command, the secure information recording unit 203-2 included in the communication device 101-2 increases the value information stored in its storage area and, when the processing in response to the increasing command is completed, transmits a completion report to the communication device 101-1 using wireless communication (S527).

The network communication unit 211-1 included in the communication device 101-1 transmits a report of completion of the processing by the communication device 101-2 in response to the increasing command to the transfer management server 102 (S529).

When the transfer management server 102 receives the report of completion of the processing in response to the increasing command from the network communication unit 211-1, the series of steps to transfer the value information is completed (S561).

When one of the communication device 101-1 and the communication device 101-2, which have belonged to an area in which both devices can wirelessly communicate with each other since, for example, one device is placed over the other device, moves away from the area, the short-distance wireless communication unit 201-1 detects a change in the electromagnetic field density and thus detects that the communication device 101-2 does not exist in this area. At this time, the short-distance wireless communication unit 201-1 stops transmitting radio waves (S565).

In this manner, the value information can be transferred from the transfer source communication device (communication device 101-1) to the transfer destination communication device (communication device 101-2), and the value information transfer process according to the first embodiment is completed.

Second Embodiment

Figure 7:
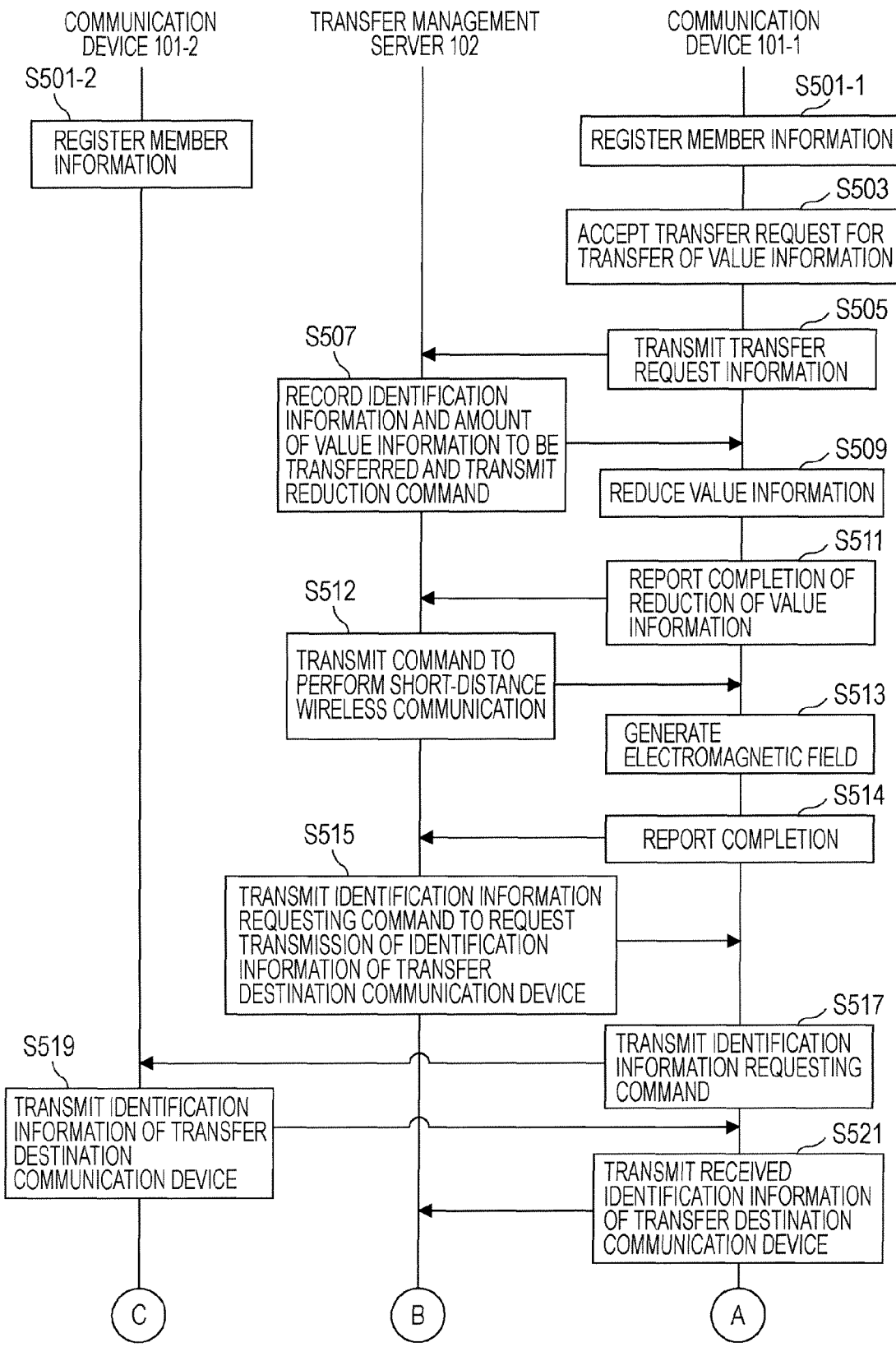
FIG. 7 is a flowchart showing the outline of a value information transfer process according to a second embodiment of the present invention.
Figure 8:
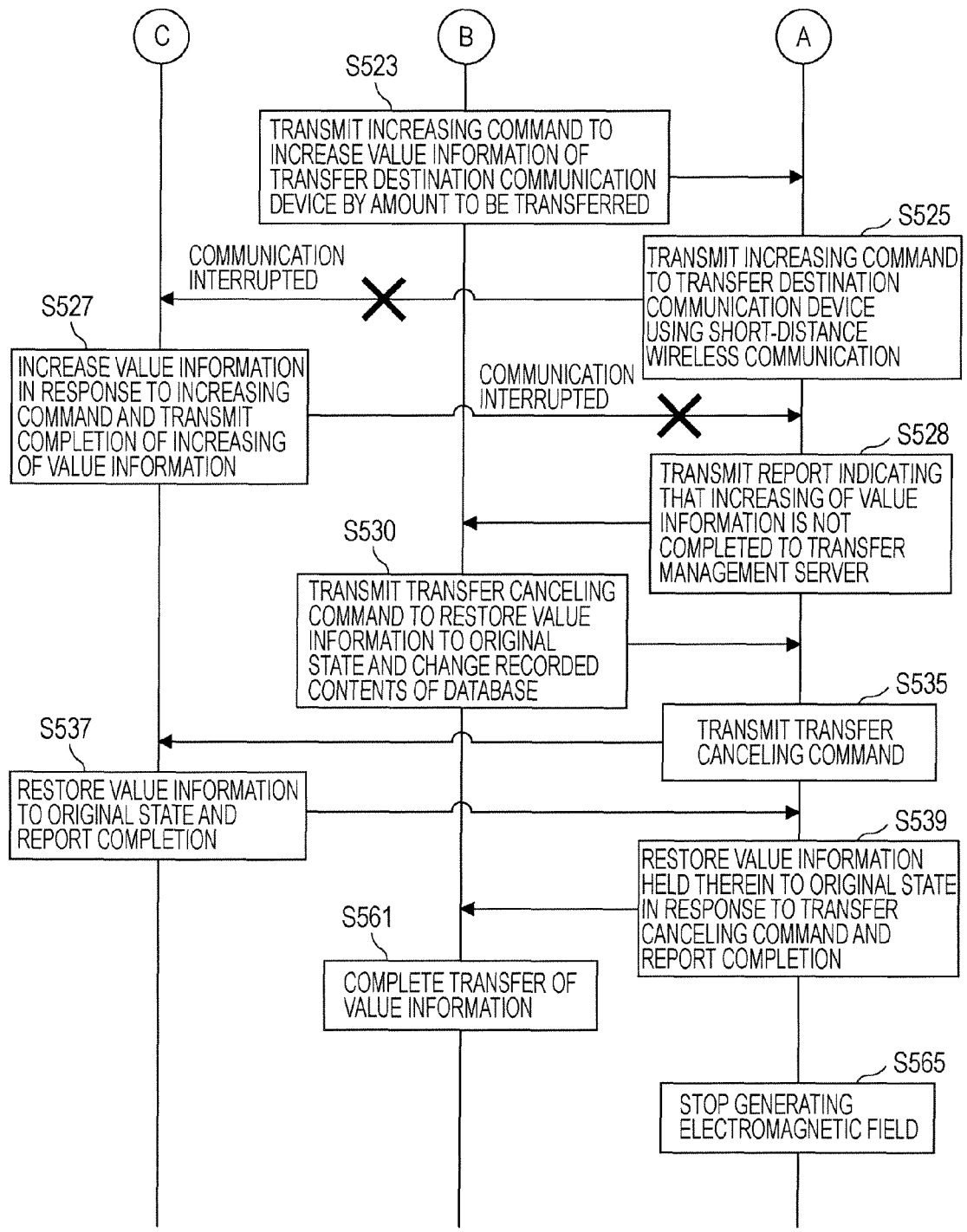
FIG. 8 is a flowchart showing the outline of the value information transfer process according to the second embodiment.

Referring now to FIGS. 7 and 8, a value information transfer process according to a second embodiment of the present invention will be described. FIGS. 7 and 8 are flowcharts schematically illustrating the value information transfer process according to the second embodiment.

The value information transfer process according to the second embodiment is a process (or a recovering process) of restoring value information to the original state when the transfer of value information from the transfer source communication device to the transfer destination communication device fails.

In the value information transfer process according to the second embodiment, the case in which the transfer source communication device accepts a transfer request for transfer of value information will be described by way of example. The case in which the transfer destination communication device accepts a transfer request for transfer of value information will be described subsequently.

In the following description, in view of the comparison between the value information transfer process according to the first embodiment and the value information transfer process according to the second embodiment, only different portions are described, and descriptions of the remaining portions are omitted to avoid repetition since they are substantially the same.

As shown in FIG. 7, in the value information transfer process according to the second embodiment, the steps from the member information registering step (S501) to the increasing command transmitting step (S523) are substantially the same as those of the value information transfer process according to the first embodiment, and hence detailed descriptions thereof are omitted.

As shown in FIG. 8, when the short-distance wireless communication unit 201-1 transmits an increasing command to the communication device 101-2 using wireless communication (S525) or when the secure information recording unit 203-2 transmits a report of completion of the processing in response to the increasing command to the communication device 101-1 using wireless communication (S527), in the event that communication is interrupted by some obstacle or the like, the data does not reach the partner communication device 101, and the value information transfer process is not properly completed.

When communication is interrupted after the increasing command transmitting step (S525) or the reporting of completion of processing in response to the increasing command (S527), it is necessary in the value information transfer system to stop the series of steps to transfer the value information and to restore the transferred value information to the original state.

As shown in FIG. 8, when no completion report is transmitted within a predetermined period of time (S527), the controller 207-1 determines that the increasing processing is not completed, and the network communication unit 211-1 transmits a report that the increasing processing is not completed to the transfer management server 102 (S528). Although the controller 207-1 measures time in this example, the embodiment of the present invention is not limited thereto.

When the value information in the communication device 101-1 and/or the communication device 101-2 is increased and/or reduced by the amount to be transferred, the access unit 251 included in the transfer management server 102 generates a transfer canceling command to cancel the increase/reduction of the value information by the amount transferred, and the network communication unit 261 transmits the transfer canceling command to the communication device 101-1 (S530).

The storage unit 263 restores, in the value information database, the record of the communication device 101-1 and/or the communication device 101-2 in which the value information has already been increased and/or reduced to the original state and deletes the corresponding record in the value information transfer database (S530).

The short-distance wireless communication unit 201-1 included in the communication device 101-1 transmits the transfer canceling command to the communication device 101-2 using wireless communication so that the value information in the partner communication device 101-2 is restored to the original state (S535).

When the secure information recording unit 203-2 included in the communication device 101-2 has increased the value information in response to the increasing command, the secure information recording unit 203-2 reduces the value information by the amount increased, and, when the processing is completed, transmits a completion report to the communication device 101-1 using wireless communication (S537).

When the communication device 101-2 has not received the increasing command or when the communication device 101-2 has received the increasing command but has not increased the value information in response to the increasing command, the transmission of the completion report (S537) is not performed, and the process proceeds to the next step.

In response to the transfer canceling command received from the transfer management server 102, the secure information recording unit 203-1 increases the value information stored in its storage area by the amount transferred, thereby restoring the value information to the original state (S539).

For example, the original state restoring step (S539) is a step of increasing, when the value information has already been reduced by the amount of 3000 yen, the value information held by the communication device 101-1 by the amount of 3000 yen, thereby restoring the value information to the original state.

When the transfer management server 102 receives a report of completion of the processing in response to the transfer canceling command from the network communication unit 211-1, the series of steps to transfer the value information is completed (S561).

When one of the communication device 101-1 and the communication device 101-2, which have belonged to an area in which both devices can wirelessly communicate with each other, moves away from the area, the short-distance wireless communication unit 201-1 detects a change in the electromagnetic field density and thus detects that the communication device 101-2 does not exist in this area. At this time, the short-distance wireless communication unit 201-1 stops transmitting radio waves (S565).

In the manner described above, the value information transfer process according to the second embodiment is completed. With the value information transfer process according to the second embodiment, when the transfer of value information from the communication device 101-1 to the communication device 101-2 fails after the communication device 101-1 has accepted the transfer request, the value information can be restored to the original state.

Third Embodiment

Figure 9:
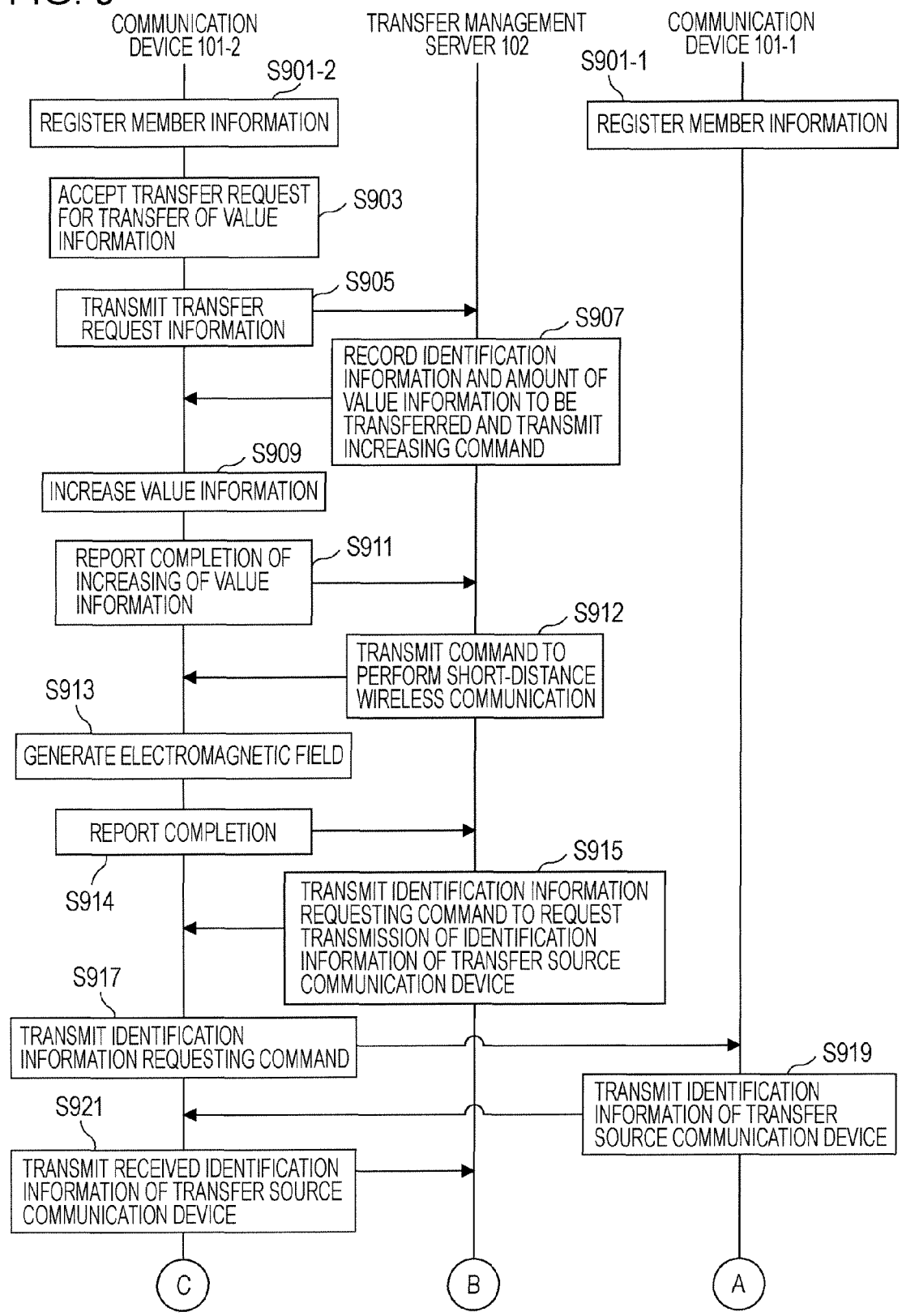
FIG. 9 is a flowchart showing the outline of a value information transfer process according to a third embodiment of the present invention.
Figure 10:
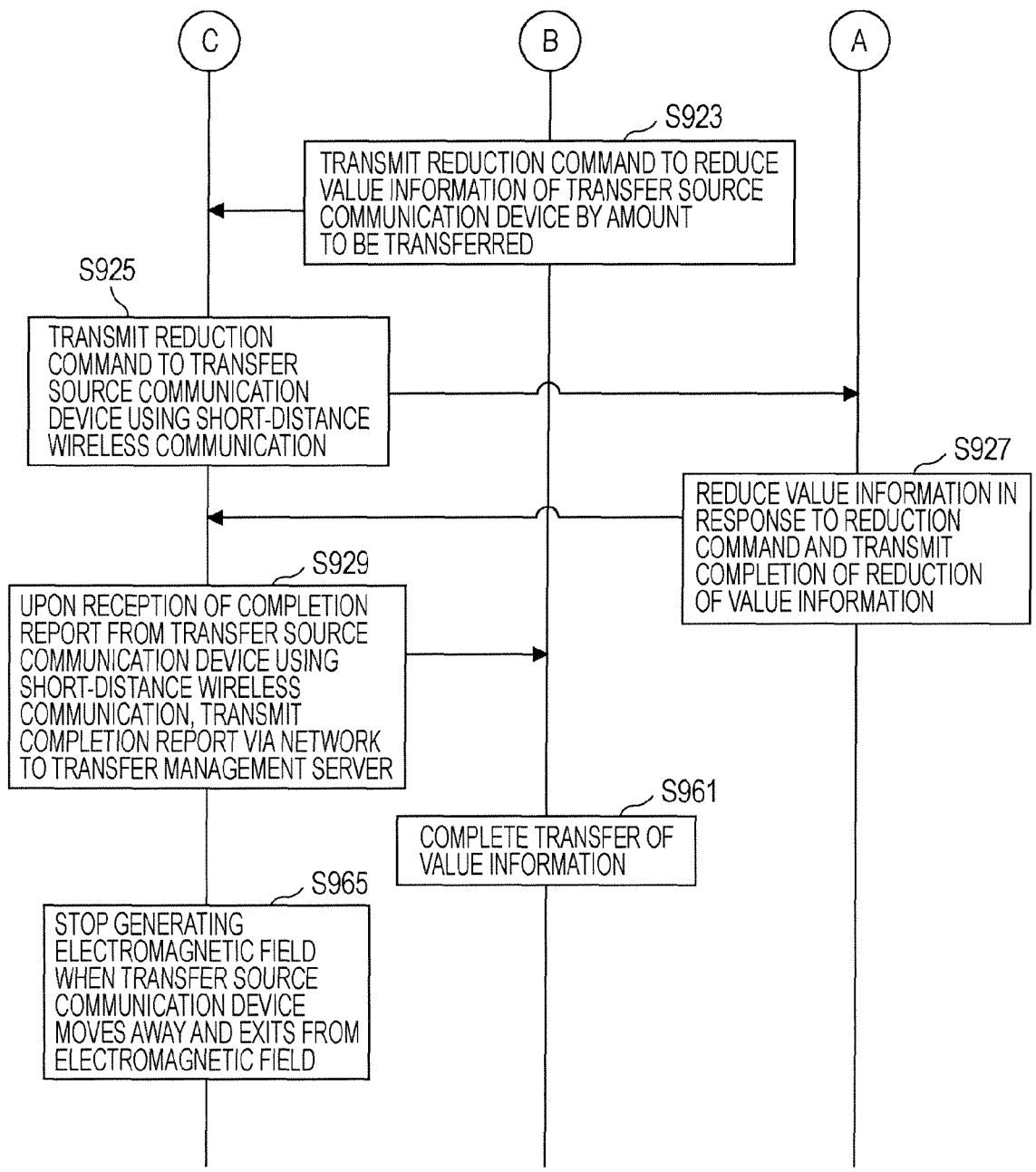
FIG. 10 is a flowchart showing the outline of the value information transfer process according to the third embodiment.

Referring now to FIGS. 9 and 10, a value information transfer process according to a third embodiment of the present invention will now be described. FIGS. 9 and 10 are flowcharts schematically illustrating the value information transfer process according to the third embodiment.

The value information transfer process according to the third embodiment is different from the value information transfer process according to the first embodiment in that a transfer request for transfer of value information is accepted by the transfer destination communication device.

As shown in FIG. 9, in order to subscribe to a value information transfer service, member information such as the user ID is registered in the transfer management server 102 using the input unit 209-1 of the transfer source communication device (communication device 101-1) (S901-1).

Member information of the transfer destination communication device (communication device 101-2) is similarly registered (S901-2).

The communication device 101-2 serving as the transfer destination communication device accepts a transfer request for transfer of value information via the input unit 209-2 (S903). At the time the request is accepted, for example, the amount of value information to be transferred is input.

In the value information transfer request accepting step (S903), for example, the amount of value information to be obtained (received) from the transfer source communication device (communication device 101-1) is input.

When the communication device 101-2 accepts the transfer request (S903) and a network communication start button or the like is selected using the input unit 209-1, the network communication unit 211-2 included in the communication device 101-2 sends transfer request information to the transfer management server 102 (S905).

When the transfer management server 102 receives the transfer request information, the access unit 251 generates an increasing command for the secure information recording unit 203-2 included in the transfer destination communication device (communication device 101-2) to increase the value information by the amount requested to be transferred and transmits the increasing command to the communication device 101-2. In addition, the access unit 251 records the contents of the request in the corresponding record in the value information transfer database described above (S907).

When the network communication unit 211-2 included in the communication device 101-2 receives the increasing command, the secure information recording unit 203-2 decrypts the increasing command with, for example, the client key and authenticates that the increasing command is a command from the transfer management server 102. It is possible to authenticate that the increasing command is a command from the movement management server 102 without using the client key.

In response to the increasing command, the secure information recording unit 203-2 increases the value information stored in its storage area (service 2) by the amount set in the increasing command (S909).

Upon completion of the increasing of the value information by the secure information recording unit 203-2 (S909), the network communication unit 211-2 included in the communication device 101-2 transmits a completion report to the transfer management server 102 (S911).

When the network communication unit 261 receives the completion report, the access unit 251 generates a command (wireless communication starting command) to activate the short-distance wireless communication unit 201-2 and to send a report using short-distance wireless communication.

The storage unit 263 increases, in the value information database, the value information of the corresponding communication device 101-2 by the amount transferred.

The network communication unit 261 transmits the wireless communication starting command to the communication device 101-2 (S912).

When the communication device 101-2 receives the wireless communication starting command, the short-distance wireless communication unit 201-2 generates an electromagnetic field (S913).

After the electromagnetic field has been generated (S913), the network communication unit 211-2 transmits a report of completion of generation of the electromagnetic field to the transfer management server 102 (S914).

To specify the transfer source communication device (communication device 101-1), the access unit 251 generates a command (identification information requesting command) to obtain the communication device ID stored in the secure information recording unit 203-1 included in the communication device 101-1.

The network communication unit 261 transmits the identification information requesting command to the communication device 101-2 (S915).

When the partner transfer source communication device (communication device 101-1) approaches within a communication range in which short-distance wireless communication can be performed and the density of the electromagnetic field changes, the short-distance wireless communication unit 201-2 captures the communication device 101-1 and transmits the identification information requesting command to the short-distance wireless communication unit 201-1 using wireless communication (S917).

In response to the identification information requesting command, the secure information recording unit 203-1 included in the communication device 101-1 transmits the communication device ID held therein to the communication device 101-2 using wireless communication (S919).

When the communication device ID of the communication device 101-1 is transmitted using wireless communication to the communication device 101-2, the communication device ID is transmitted to the transfer management server 102 via the network 103 (S921).

Referring to FIG. 10, the access unit 251 included in the transfer management server 102 generates a command (reduction command) to reduce the value information held by the communication device 101-1 by the amount to be transferred, and the network communication unit 261 transmits the reduction command to the communication device 101-2 (S923).

The short-distance wireless communication unit 201-2 transmits the reduction command to the communication device 101-1 using wireless communication (S925).

In response to the reduction command, the secure information recording unit 203-1 included in the communication device 101-1 reduces the value information stored in its storage area and, when the processing in response to the reduction command is completed, transmits a completion report to the communication device 101-2 using wireless communication (S927).

The network communication unit 211-2 included in the communication device 101-2 transmits a report of completion of the processing by the communication device 101-1 in response to the reduction command to the transfer management server 102 (S929)

When the transfer management server 102 receives the report of completion of the processing in response to the reduction command from the network communication unit 211-2, the series of steps to transfer the value information is completed (S961).

When one of the communication device 101-1 and the communication device 101-2, which have belonged to an area in which both devices can wirelessly communicate with each other since, for example, one device is placed over the other device, moves away from the area, the short-distance wireless communication unit 201-2 detects a change in the electromagnetic field density and thus detects that the communication device 101-1 does not exist in this area. At this time, the short-distance wireless communication unit 201-2 stops transmitting radio waves (S965).

In this manner, the value information can be transferred from the transfer source communication device (communication device 101-1) to the transfer destination communication device (communication device 101-2), and the value information transfer process according to the third embodiment is completed.

Fourth Embodiment

Figure 11:
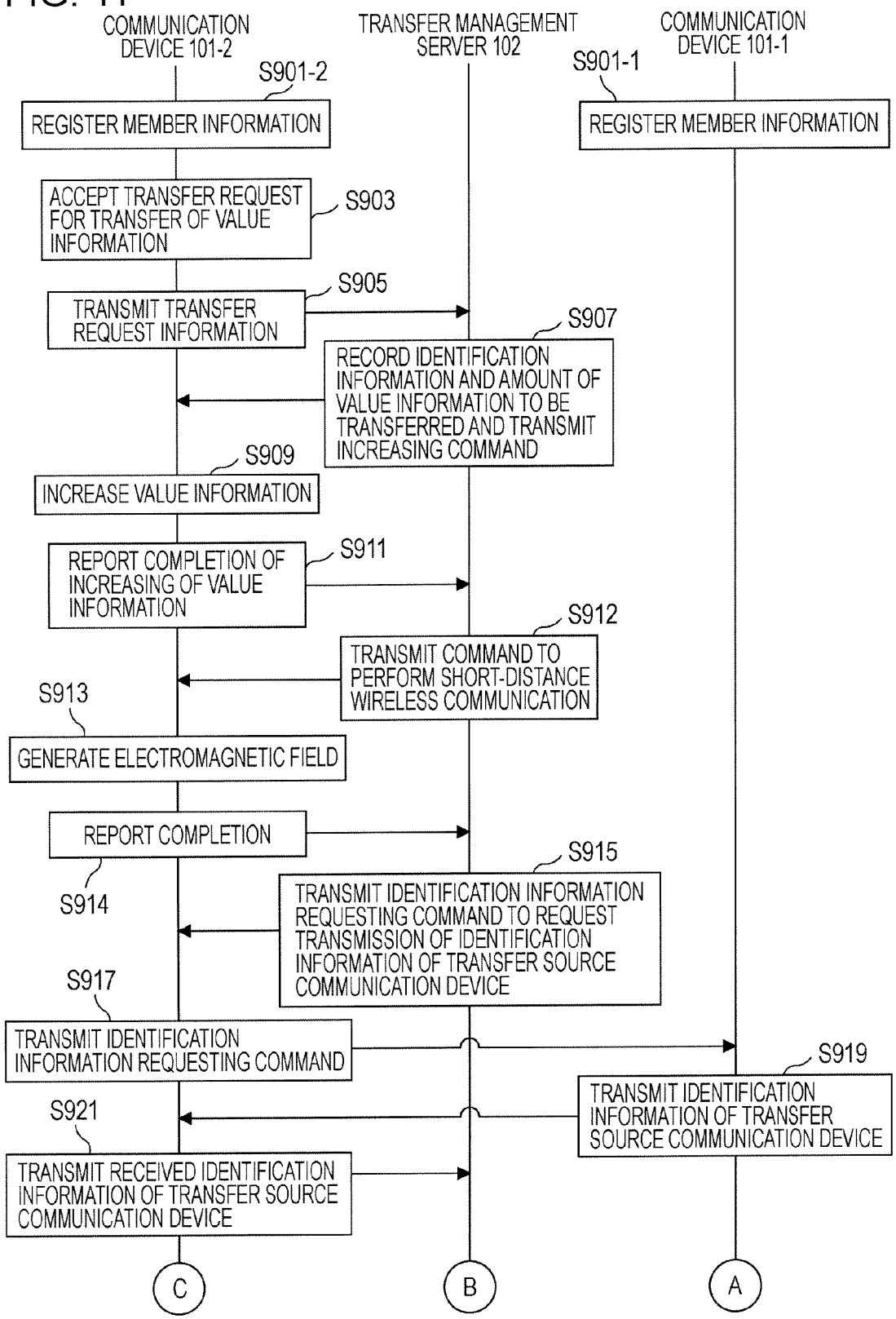
FIG. 11 is a flowchart showing the outline of a value information transfer process according to a fourth embodiment of the present invention.
Figure 12:
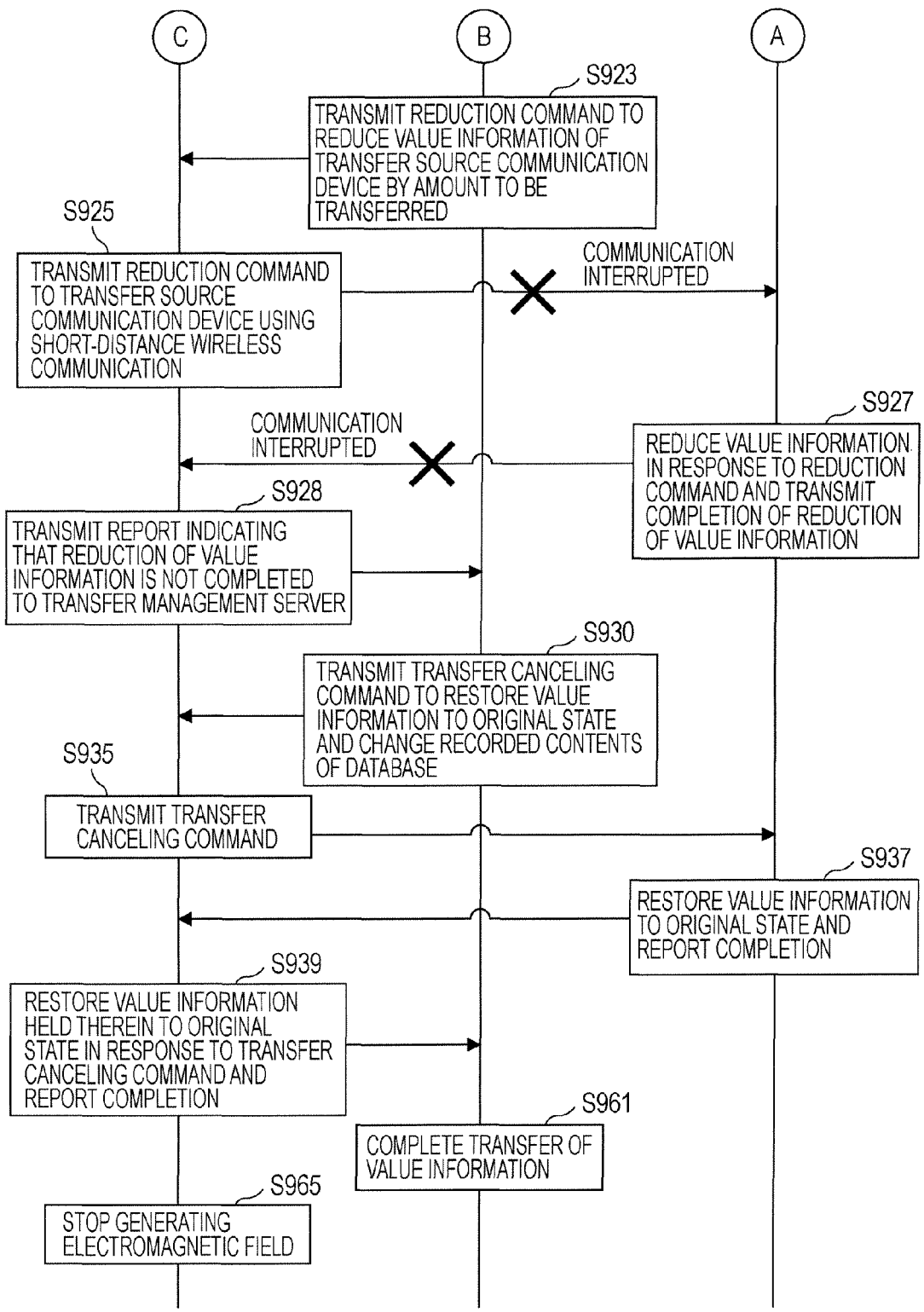
FIG. 12 is a flowchart showing the outline of the value information transfer process according to the fourth embodiment.

Referring now to FIGS. 11 and 12, a value information transfer process according to a fourth embodiment of the present invention will be described. FIGS. 11 and 12 are flowcharts schematically illustrating the value information transfer process according to the fourth embodiment.

The value information transfer process according to the fourth embodiment is a process (or a recovering process) of restoring value information to the original state when the transfer of value information from the transfer source communication device to the transfer destination communication device fails.

In the value information transfer processes according to the first and second embodiments described above, the case in which the transfer source communication device accepts a transfer request for transfer of value information has been described. In the value information transfer process according to the fourth embodiment, the case in which the transfer destination communication device accepts a transfer request for transfer of value information will be described.

In the following description, in view of the comparison between the value information transfer process according to the third embodiment and the value information transfer process according to the fourth embodiment, only different portions are described, and descriptions of the remaining portions are omitted to avoid repetition since they are substantially the same.

As shown in FIG. 11, in the value information transfer process according to the fourth embodiment, the steps from the member information registering step (S901) to the reduction command transmitting step (S923) are substantially the same as those of the value information transfer process according to the third embodiment, and hence detailed descriptions thereof are omitted.

As shown in FIG. 12, when the short-distance wireless communication unit 201-2 transmits a reduction command to the communication device 101-1 using wireless communication (S925) or when the secure information recording unit 203-1 transmits a report of completion of the processing in response to the reduction command to the communication device 101-2 using wireless communication (S927), in the event that communication is interrupted by some obstacle or the like, the data does not reach the partner communication device 101, and the value information transfer process is not properly completed.

When communication is interrupted after the reduction command transmitting step (S925) or the reporting of completion of processing in response to the reduction command (S927), it is necessary in the value information transfer system to stop the series of steps to transfer the value information and to restore the transferred value information to the original state.

As shown in FIG. 12, when no completion report is transmitted within a predetermined period of time (S927), the controller 207-2 determines that the reduction processing is not completed, and the network communication unit 211-2 transmits a report that the reduction processing is not completed to the transfer management server 102 (S928). Although the controller 207-2 measures time in this example, the embodiment of the present invention is not limited thereto.

When the value information in the communication device 101-1 and/or the communication device 101-2 is increased and/or reduced by the amount to be transferred, the access unit 251 included in the transfer management server 102 generates a transfer canceling command to cancel the increase/reduction of the value information by the amount transferred, and the network communication unit 261 transmits the transfer canceling command to the communication device 101-2 (S930).

The storage unit 263 restores, in the value information database, the record of the communication device 101-1 and/or the communication device 101-2 in which the value information has already been increased and/or reduced to the original state and deletes the corresponding record in the value information transfer database (S930).

The short-distance wireless communication unit 201-2 included in the communication device 101-2 transmits the transfer canceling command to the communication device 101-1 using wireless communication so that the value information in the partner communication device 101-1 is restored to the original state (S935).

When the secure information recording unit 203-1 included in the communication device 101-1 has reduced the value information in response to the reduction command, the secure information recording unit 203-1 increases the value information by the amount reduced, and, when the processing is completed, transmits a completion report to the communication device 101-2 using wireless communication (S937).

When the communication device 101-1 has not received the reduction command or when the communication device 101-1 has received the reduction command but has not reduced the value information in response to the reduction command, the transmission of the completion report (S937) is not performed, and the process proceeds to the next step.

In response to the transfer canceling command received from the transfer management server 102, the secure information recording unit 203-2 reduces the value information stored in its storage area by the amount transferred, thereby restoring the value information to the original state (S939).

For example, the original state restoring step (S939) is a step of reducing, when the value information has already been increased by the amount of 3000 yen, the value information held by the communication device 101-2 by the amount of 3000 yen, thereby restoring the value information to the original state.

When the transfer management server 102 receives a report of completion of the processing in response to the transfer canceling command from the network communication unit 211-2, the series of steps to transfer the value information is completed (S961).

When one of the communication device 101-1 and the communication device 101-2, which have belonged to an area in which both devices can wirelessly communicate with each other, moves away from the area, the short-distance wireless communication unit 201-2 detects a change in the electromagnetic field density and thus detects that the communication device 101-1 does not exist in this area. At this time, the short-distance wireless communication unit 201-2 stops transmitting radio waves (S965).

In the manner described above, the value information transfer process according to the fourth embodiment is completed. With the value information transfer process according to the fourth embodiment, when the transfer of value information from the communication device 101-1 to the communication device 101-2 fails after the communication device 101-2 has accepted the transfer request, the value information can be restored to the original state.

The series of steps described above can be performed using hardware or software. If software is used for this series of steps, a program constituting the software may be installed in an information processing apparatus such as a general-purpose computer or a microcomputer, thereby allowing the information processing apparatus to function as the communication device 101 and/or the movement management server 102.

The program may be preliminarily recorded onto a recording medium, such as a hard disk or a ROM, built inside the computer.

Other than storing the program on a hard disk drive, the program may be temporarily or permanently stored (recorded) on a removable recording-medium such as a flexible disk, a compact disc read only memory (CD-ROM), a magneto-optical (MO) disk, a digital versatile disc (DVD), a magnetic disk, or a semiconductor memory. The removable recording-medium of this type may be distributed as so-called packaged software.

Other than installing the program in the computer from the removable recording-medium described above, the program may be transferred to the computer from a download site by radio via a satellite for digital satellite broadcasting, or may be transferred to the computer by wire via a network such as a local area network (LAN) or the Internet. The transferred program is thus received by the computer and is installed in an internal hard disk or the like.

In the specification, the steps describing the program for allowing the computer to perform various processes are not necessarily performed in the time order of the flowcharts described above. The steps may be performed in parallel or individually (for example, by parallel processing or by object-oriented processing).

The program may be either operated with one computer or operated with multiple computers in a distributed manner.

The description of the value information transfer system according to the first to fourth embodiments of the present invention is completed. The value information transfer system has the following significant advantages. (1) A command to increase or reduce value information held by each communication device 101 is not generated by the communication device 101 serving as the communication partner but generated by the movement management server 102. Therefore, duplication of value information or transmission of an unauthorized command to the partner communication device is prevented. When one communication device 101 is placed over another communication device 101, value information can be securely and directly transferred. (2) In the event that communication during transfer of value information is interrupted and hence the transfer of value information is not properly completed, when the communication device 101 performs the processing in response to a command generated on the basis of the value information transfer database or the like held in the movement management server 102, the value information can be restored to the original state. Accordingly, value information inconsistency, such as an invalid reduction in value information, is prevented from occurring. (3) Since both communication devices 101 can accept a transfer request for transfer of value information irrespective of being the transfer source communication device or the transfer destination communication device, the user can make a transfer request to the communication device 101 without taking into consideration which communication device serves as the transfer source communication device. Accordingly, the value information transfer process becomes more user-friendly.

While the preferred embodiments of the present invention have been described with reference to the accompanying drawings, the present invention is not limited to these embodiments. It is to be anticipated by those skilled in the art that a variety of modifications or changes may be made without departing from the technical scope of the present invention and these modifications or changes also fall within the technical scope of the present invention.

In the embodiments described above, the case in which the communication device 101 is a cellular phone has been described by way of example. However, the present invention is not limited thereto and the communication device 101 may be any device having a contactless IC card function and a communication function. For example, the communication device 101 may be a personal digital assistant (PDA) or a personal computer (PC).

Although wireless communication is performed in the embodiments described above, the present invention is also applicable to wired communication or communication involving both radio and wire.

What is claimed is:

1. A value information transfer system for transferring value information, comprising:
   a transfer source communication device;
   a transfer destination communication device; and
   a transfer management server operable to manage transfer of the value information,
   wherein the value information held by the transfer source communication device is transferred to the transfer destination communication device,
   wherein the transfer source communication device is connected via a network to the transfer management server,
   wherein the transfer source communication device includes
      a transfer request acceptor operable to accept a transfer request for requesting part or all of the value information held by the transfer source communication device to be transferred to the transfer destination communication device,
      a transfer request information transmitter operable to transmit the request, which is accepted by the transfer request acceptor, as transfer request information to the transfer management server via the network, and
      a command executor operable to execute at least one command, which is generated by the transfer management server, for transferring the value information from the transfer source communication device to the transfer destination communication device,
   wherein the transfer management server includes
      a command generator operable to generate said at least one command in response to the transfer request information from the transfer source communication device, said at least one command including a reduction command to reduce the value information held by the transfer source communication device by an amount of the value information to be transferred from the transfer source communication device to the transfer destination communication device and an increase command to increase the value information held by the destination source communication device by an amount of the value information to be transferred from the transfer source communication device to the transfer destination communication device, and
      a command transmitter operable to transmit the reduction command and the increase command generated by the command generator to the transfer source communication device via the network, and
   wherein the transfer destination communication device includes
      a command receiver operable to receive the increase command, which is generated by the command generator of the transfer management server, from the transfer source communication device using wireless communication when the transfer destination communication device exists in a communicable range in which the transfer destination communication device can perform wireless communication with the transfer source communication device, and
      a value information increasing unit operable to increase, in response to the increase command, value information held by the transfer destination communication device by an amount of the value information to be transferred from the transfer source communication device to the transfer destination communication device.

2. The value information transfer system according to claim 1, wherein
   the command generator generates an identification information requesting command to request for identification information of the transfer destination communication device, the command transmitter transmits the identification information requesting command to the transfer source communication device via the network, when the transfer destination communication device serving as a destination of transfer of the value information exists in the communicable range, the command receiver included in the transfer destination communication device receives the identification information requesting command, and in response to the identification information requesting command, an identification information obtaining unit included in the transfer destination communication device obtains the identification information of the transfer destination communication device.

3. The value information transfer system according to claim 1, wherein the transfer source communication device further includes an interruption detector operable to detect interruption of wireless communication between the transfer source communication device and the transfer destination communication device, and a transfer cancel requesting unit operable to request the transfer management server to restore the value information held by at least one of the transfer source communication device and the transfer destination communication device to a state prior to the transfer, wherein the transfer management server further includes a value information transfer database that stores a record including transfer source communication device identification information for identifying the transfer source communication device, transfer destination communication device identification information for identifying the transfer destination communication device, and the value information to be transferred from the transfer source communication device to the transfer destination communication device, the command generator generates a transfer canceling command to restore, on the basis of the record stored in the value information transfer database, the value information held by at least one of the transfer source communication device and the transfer destination communication device to the state prior to the transfer, and the command transmitter transmits the transfer canceling command to the transfer source communication device.

4. The value information transfer system according to claim 3, wherein the record stored in the value information transfer database further includes a date at which the value information is transferred.

5. The value information transfer system according to claim 3, wherein, when no report of completion of execution of the increase command is transmitted from the transfer destination communication device within a predetermined period of time after the increase command has been transmitted to the transfer destination communication device, the interruption detector detects interruption of wireless communication.

6. A value information transfer system for transferring value information, comprising:

a transfer source communication device;

a transfer destination communication device; and a transfer management server operable to manage transfer of the value information, wherein the value information held by the transfer source communication device is transferred to the transfer destination communication device, wherein the transfer destination communication device is connected via a network to the transfer management server, wherein the transfer destination communication device includes a transfer request acceptor operable to accept a transfer request for requesting part or all of the value information held by the transfer source communication device to be transferred to the transfer destination communication device, a transfer request information transmitter operable to transmit the request, which is accepted by the transfer request acceptor, as transfer request information to the transfer management server via the network, and a command executor operable to execute at least one command, which is generated by the transfer management server, for transferring the value information from the transfer source communication device to the transfer destination communication device, wherein the transfer management server includes a command generator operable to generate said at least one command in response to the transfer request information from the transfer destination communication device, said at least one command including a reduction command to reduce the value information held by the transfer source communication device by an amount of the value information to be transferred from the transfer source communication device to the transfer destination communication device and an increase command to increase the value information held by the destination source communication device by an amount of the value information to be transferred from the transfer source communication device to the transfer destination communication device, and a command transmitter operable to transmit the increase command and the reduction command generated by the command generator to the transfer destination communication device via the network, and wherein the transfer source communication device includes a command receiver operable to receive the reduction command, which is generated by the command generator of the transfer management server, from the transfer destination communication device using wireless communication when the transfer source communication device exists in a communicable range in which the transfer source communication device can perform wireless communication with the transfer destination communication device, and a value information reduction unit operable to reduce, in response to the reduction command, the value information held by the transfer source communication device by an amount of the value information to be transferred from the transfer source communication device to the transfer destination communication device.

7. A value information transfer method for transferring value information held by a transfer source communication device to a transfer destination communication device, comprising the steps of:

accepting, by the transfer source communication device, a transfer request for requesting part or all of the value information held by the transfer source communication device to be transferred to the transfer destination communication device;

transmitting, by the transfer source communication device, the accepted transfer request as transfer request information via a network to a transfer management server for managing transfer of the value information;

transmitting, by the transfer management server, a reduction command to reduce the value information held by the transfer source communication device by an amount of the value information to be transferred from the transfer source communication device to the transfer destination communication device via the network to the transfer source communication device serving as a source of the transfer request;

reducing, by the transfer source communication device, the value information held by the transfer source communication device by the amount of the value information to be transferred from the transfer source communication device to the transfer destination communication device;

transmitting, from the transfer management server to the transfer source communication device via the network, an increasing command to increase value information held by the transfer destination communication device by the amount of the value information to be transferred from the transfer source communication device to the transfer destination communication device;

transmitting, by the transfer source communication device, the increasing command to the transfer destination communication device using wireless communication when the transfer destination communication device exists in a communicable range in which the transfer destination communication device can perform wireless communication with the transfer source communication device; and increasing, by the transfer destination communication device, in response to the increasing command, the value information held by the transfer destination communication device by the amount of the value information to be transferred from the transfer source communication device to the transfer destination communication device.

8. The value information transfer method according to claim 7, further comprising the steps of:

transmitting, upon reception of an identification information obtaining command to obtain identification information regarding the transfer destination communication device from the transfer management server via the network, when the transfer destination communication device exists in the communicable range, the identification information obtaining command to the transfer destination communication device;

transmitting the identification information of the transfer destination communication device, which is transmitted from the transfer destination communication device, to the transfer management server via the network; and recording at least one of identification information regarding the transfer destination communication device and the value information to be transferred from the transfer source communication device to the transfer destination communication device in association with identification information regarding the transfer source communication device included in the transfer request information.

9. The value information transfer method according to claim 8, further comprising the steps of:

transmitting, when the value information held by the transfer destination communication device is not increased within a predetermined period of time, information indicating that the increasing of the value information is not completed from the transfer source communication device to the transfer management server via the network;

receiving a transfer canceling command to restore the reduced value information to the original state from the transfer management server via the network; and changing, in response to the transfer canceling command, the value information held by the transfer source communication device to a state prior to the reduction of the value information.

10. A value information transfer method for transferring value information held by a transfer source communication device to a transfer destination communication device, comprising the steps of:

accepting, by the transfer destination communication device, a transfer request for requesting part or all of the value information held by the transfer source communication device to be transferred to the transfer destination communication device;

transmitting, by the transfer destination communication device, the accepted transfer request as transfer request information via a network to a transfer management server for managing transfer of the value information;

transmitting, by the transfer management server, an increasing command to increase value information held by the transfer destination communication device by an amount of the value information to be transferred from the transfer source communication device to the transfer destination communication device via the network;

increasing, by the transfer destination communication device, the value information held by the transfer destination communication device by the amount of the value information to be transferred from the transfer source communication device to the transfer destination communication device;

transmitting, from the transfer management server to the transfer destination communication device via the network, a reduction command to reduce the value information held by the transfer source communication device by the amount of the value information to be transferred from the transfer source communication device to the transfer destination communication device;

transmitting, by the transfer destination communication device, the reduction command to the transfer source communication device using wireless communication when the transfer source communication device exists in a communicable range in which the transfer source communication device can perform wireless communication with the transfer destination communication device; and reducing, at the transfer source communication device, in response to the reduction command, the value information held by the transfer source communication device by the amount of the value information to be transferred from the transfer source communication device to the transfer destination communication device.

11. The value information transfer method according to claim 10, further comprising the steps of:

receiving an identification information obtaining command for obtaining identification information regarding the transfer source communication device from the transfer management server via the network and, when the transfer source communication device exists in the communicable range, transmitting the identification information obtaining command to the transfer source communication device;

transmitting, upon reception of the identification information regarding the transfer source communication device, the identification information regarding the transfer source communication device to the transfer management server via the network; and associating information regarding the transfer destination communication device included in the transfer request information, the identification information regarding the transfer source communication device, and the value information to be transferred from the transfer source communication device to the transfer destination communication device with one another.

12. The value information transfer method according to claim 11, further comprising the steps of:

transmitting, when the value information held by the transfer source communication device is not reduced within a predetermined period of time, information indicating that the reduction of the value information is not completed from the transfer destination communication device to the transfer management server via the network;

obtaining a transfer canceling command to restore the increased value information to the original state from the transfer management server via the network; and executing the transfer canceling command to change the value information held by the transfer destination communication device to a state prior to the increasing of the value information.

13. A server comprising:

A processor;

a receiver that receives transfer request information from a mobile communication device that is configured to use Near Field Communication;

a command generator that generates at least one command in response to the transfer request information from the mobile communication device, said at least one command including an increase command to increase value information held by another mobile communication device by an amount of the value information to be transferred from the mobile communication device to the another mobile communication device; and a command transmitter that transmits the increase command generated by the command generator by relaying the increase command through the mobile communication device to the another mobile communication device by using the Near Field Communication.

14. A mobile communication device, comprising:

A processor;

a transfer request acceptor that accepts a transfer request that requests part or all of value information held by the mobile communication device to be transferred to another mobile communication device;

a transmitter that transmits transfer request information to a server;

a receiver that receives, from the server, at least one command that causes the value information from the mobile communication device to be transferred to the another mobile communication device, said at least one command including an increase command to increase the value information held by another mobile communication device by an amount of the value information to be transferred from the mobile communication device to the another mobile communication device, wherein the transmitter transmits the increase command received from the server to the another mobile communication device by using Near Field Communication when the another mobile communication device exists in a communicable range in which the mobile communication device is configured to perform the Near Field Communication with the another communication device.

\* \* \* \* \*